United States Patent [19]

Buckwalter

[11] 3,821,190

[45] June 28, 1974

[54] REDUCTION OF AROMATIC NITRO COMPOUNDS TO AROMATIC AZOXY COMPOUNDS USING A PURE ACCICULAR CRYSTALLINE BENZOQUINONE AS A REDUCTION PROMOTER

[75] Inventor: Geoffrey R. Buckwalter, Flemington, N.Y.

[73] Assignee: Bordon, Inc., Columbus, Ohio

[22] Filed: Feb. 22, 1971

[21] Appl. No.: 117,735

Related U.S. Application Data

[62] Division of Ser. No. 728,765, May 13, 1968, abandoned.

[52] U.S. Cl............ 260/143, 250/396 R, 260/569
[51] Int. Cl.................... C07c 49/64, C07c 105/00, C07c 109/04
[58] Field of Search............................ 260/569, 143

[56] References Cited
UNITED STATES PATENTS

| | | | |
|---|---|---|---|
| 2,383,134 | 8/1945 | Lacey et al. | 260/569 |
| 2,684,358 | 7/1954 | Sogn | 260/143 |
| 2,684,359 | 7/1954 | Sogn | 260/143 |
| 2,794,046 | 5/1957 | Sogn | 260/569 |
| 2,794,047 | 5/1957 | Sogn | 260/569 |
| 3,063,980 | 11/1962 | Bloom et al. | 260/205 |
| 3,203,947 | 8/1965 | Doering et al. | 260/143 |
| 3,205,217 | 9/1965 | Kwiatek et al. | 260/143 |

*Primary Examiner*—Floyd D. Higel
*Attorney, Agent, or Firm*—George L. Rushton; George P. Maskas

[57] ABSTRACT

In the reduction of reducible aromatic nitrogen compounds by conventional reducing agents, a pure benzoquinone may be employed as a reduction promoter. Impure benzoquinone may be purified by various methods, such as by sublimation and by recrystallization. Substituted benzoquinones, such as halogenated or cyano-substituted benzoquinones, may be employed. The benzoquinone is employed in an amount ranging from about 0.5 to about 4.0 parts per 100 parts of the reducible aromatic nitrogen compound being treated. The presence of a metallic cyanide in the reaction mixture is advantageous, particularly in the reduction of the aromatic nitrogen from the azoxy to the hydrazo stage.

10 Claims, No Drawings

REDUCTION OF AROMATIC NITRO COMPOUNDS TO AROMATIC AZOXY COMPOUNDS USING A PURE ACCICULAR CRYSTALLINE BENZOQUINONE AS A REDUCTION PROMOTER

REFERENCE TO RELATED APPLICATION

This application is a division of co-pending application Ser. No. 728,765, filed May 13, 1968 and now abandoned.

BACKGROUND OF THE INVENTION

1. Field of the Invention

This invention relates to the reduction of aromatic nitrogen compounds containing nitrogen in a reducible form as a nuclear substituent. More particularly, it relates to the enhancing of the reducing power of conventional reducing agents in the reduction of such aromatic nitrogen compounds.

2. Description of the Prior Art

The reduction of aromatic nitrogen compounds containing nitrogen in a reducible form as a nuclear substituent is well known in the art. Thus it is known to reduce aromatic nitro compounds, aromatic nitroso compounds, aromatic azoxy compounds, aromatic azo compounds and aromatic hydroxylamino compounds by means of a variety of conventional reducing agents. These reducing agents, normally employed in an alkaline media, include aldehydes, such as formaldehyde, reducing sugars, such as "cerelose," and metal alcoholates, such as alcoholic caustic alkali.

Numerous patents relating to the reduction of aromatic nitrogen compounds are available, as for example the Sogn patents, U.S. Pat. Nos. 2,645,636, and 2,794,047, and the Anderson et al patent, U.S. Pat. No. 2,804,453. As indicated in these patents, it is well known in the art that the reduction of aromatic nitrogen compounds may be enhanced by carrying out the reduction in a reaction mixture in which one or more reduction promoters of various specific types are employed. Thus the Sogn patents referred to above employ naphthoquinoid reduction promoters in conjunction with reducing agents such as a metal alcoholate or a reducing sugar and a caustic alkali. The Anderson et al patent discloses use of a class of reduction promoters comprising certain derivatives of benzoquinone that are designated as "orthocycloalkano-benzoquinoid compounds." Especially preferred reduction promoters are 2,3-cycloalkano-1,4 benzoquinones, such as 2,3-cyclobuteno-1,4-benzoquinone.

Reduction promoters of the type heretofore disclosed serve to enhance the reduction of the aromatic nitrogen compound, and often make possible the use of milder reaction conditions and/or the use of decreased amounts of reducing agent. The reduction promoters heretofore disclosed or known in the art, however, tend to be relatively expensive, and the desire for more economical reduction promoters always exist in the art.

It is an object of the present invention, therefore, to provide an improved process for the reduction of reducible aromatic nitrogen compounds.

It is another object of the present invention to provide a process in which an improved reduction promoter for the reduction of aromatic nitrogen compounds may be employed.

It is another object of the present invention to provide a process for the reduction of a reducible aromatic nitrogen compound in which a more economical reduction promoter may be employed.

SUMMARY OF THE INVENTION

It has been found that benzoquinones of requisite purity are effective promoters of the reduction of aromatic nitrogen compounds. The benzoquinones with the scope of the present invention include both benzoquinone and substituted benzoquinone, such as halogenated benzoquinone and cyano-substituted benzoquinone. The promotional activity of the pure benzoquinones is surprising since it is well known in the art that impure benzoquinone prepared in a conventional manner is relatively ineffective as a reduction promoter.

Benzoquinone of the requisite purity may be obtained by purifying impure commercial benzoquinone lacking the desired promotional activity by sublimation, recrystallization and the like. The pure benzoquinone obtained in this manner comprises an acicular, bright yellow crystalline material as opposed to the off-color material frequently obtained from commercial sources of benzoquinones. By taking proper precautions, it may be possible to produce a benzoquinone of the requisite purity so as to obviate the need for the purification techniques referred to above.

It is within the scope of the present invention to employ either a single pure benzoquinone reduction promoter or a mixture of such pure benzoquinone promoters. The pure benzoquinone reduction promoter, or mixture of such promoters, may be employed in amounts generally within the range of from about 0.5 to about 4.0 parts of the benzoquinone reduction promoter per 100 parts of reducible aromatic nitrogen compound.

The pure benzoquinone reduction promoter of the present invention may be employed in conjunction with any of the commonly employed reducing agents, such as alkehydes, reducing sugars, and metal alcoholates. Any aromatic nitrogen compound containing nitrogen in a reducible form as a nuclear substituent may be reduced with such conventional reducing agents in the presence of the pure benzoquinone reduction promoter in accordance with the present invention. For example, nitrobenzene may be reduced to azoxybenzene and further reduced to hydrazobenzene.

The reduction promoter of the present invention will ordinarily be employed in an alkaline media, as in an alkali metal hydroxide solution. Advantageously, the reaction is carried out in the presence of a metallic cyanide compound, such as potassium cyanide. The cyanide material will generally be employed in an amount ranging from about 0.5 to about 4.0 parts per 100 parts of the aromatic nitrogen compound undergoing reduction. The presence of the cyanide material is particularly advantageous in the reduction of the aromatic nitrogen compound from the azoxy to the hydrazo stage.

DETAILED DESCRIPTION OF THE INVENTION

The present invention relates generally to the reduction of aromatic nitrogen compounds containing nitrogen in a reducible form as a nuclear substituent. Illustrative of the aromatic nitrogen compounds that may be reduced in accordance with the present invention are aromatic nitro compounds, such as nitrobenzene and o-nitrochlorobenzene; aromatic nitroso compounds, such as nitrosobenzene; aromatic azoxy compounds, such as azoxybenzene and 2,2'-dichloroazoxybenzene; aromatic azo compounds, such as azobenzene; aromatic hydroxylamino compounds, such as phenyl hydroxyl amine; and nitro naphthalenes, such as 1-nitronaphthalene and 2-nitronaphthalene. In such compounds, the nitrogen is at a higher stage of oxidation than the hydrazo stage. The present invention is particularly useful in the reduction of nitro compounds, such as nitrobenzene and o-nitrochlorobenzene, to the azoxy stage, such as azoxybenzene and 2,2'-dichloroazoxybenzene, and in the further reduction of such azoxy compounds to the hydrazo stage, e.g. hydrazobenzene and 2,2'-dichlorohydrazobenzene. The present invention permits the achieving of substantial economies in the overall cost of manufacturing hydrazo compounds useful for various purposes as in the manufacture of diazo pigments from reducible aromatic nitrogen compounds in which the nitrogen is at a higher stage of oxidation than the hydrazo stage.

The desired reduction of the aromatic nitrogen compounds in accordance with the present invention may be accomplished with any of the conventional, commonly known reducing agents. For example, various aldehydes free from aliphatic hydroxyl groups adjacent to the aldehydic oxo radical can be employed in the practice of the present invention. Such aldehydes include aliphatic aldehydes of said type, such as those containing one to four carbon atoms, aromatic aldehydes of said type, and heterocyclic aldehydes of said type. Illustrative of such aldehydes are formaldehyde, acetaldehyde, propionaldehyde, butyraldehyde, benzaldehyde and furfuraldehyde. Stabilized forms of the aldehydes and compounds capable of reverting to aldehydes in a caustic alkaline reaction media, such as paraformaldehyde and hexamethylentetramine, may also be employed.

Various reducing sugars may also be employed as the reducing agent in the practice of the present invention. Such reducing sugars include dextrose (glucose), galactose, fructose, xylose, invert sugar, glycol aldehyde, glycerol aldehyde, and the like.

The aldehydes and reducing sugars referred to above are commonly employed in an alkaline media, such as with caustic alkalis. Other well known and suitable alkaline reducing agents are the metal alcoholates, especially alkali metal alcoholates. In place of a preformed alcoholate, alkali metal hydroxide and an alcohol, such as methanol, may be employed. As well known in the art, it is generally necessary to employ stronger reducing agents in the reduction of azoxy compounds to the hydrazo stage than is required in the reduction of an aromatic nitro compound to the azoxy stage. Zinc and alkali are at times employed in the reduction to the hydrazo stage. Alkali metal alcoholates are ordinarily not effective for carrying the reduction beyond the azoxy stage unless high temperatures and pressures, such as temperatures of 140° to 180°C at pressures of 10 or more atmospheres, are employed. The desired reduction of the aromatic nitrogen compound is usually carried out by maintaining the temperature of the reaction mixture containing the nitrogen compound, the reducing agent and the reduction promoter such that the reaction proceeds at a moderate rate. Since the reaction is exothermic in nature, it is often desirable to cool the reaction mixture so as to maintain the desired temperature, as for example, between about 50°C and 75°C or more particularly from 55°C to 65°C.

In accordance with the improved process of the present invention, the desired reduction of the aromatic nitrogen compound is accomplished by means of a conventional reducing agent in an alkaline media in the presence of a small amount of a pure benzoquinone compound. The term "benzoquinone" as employed herein with reference to the present invention, refers to 1,2-benzoquinone and 1,4-benzoquinone, together with substituted benzoquinones of these types. Such substituted benzoquinones include halogenated benzoquinones and cyano-substituted benzoquinones. Illustrative of the halogenated benzoquinones of the present invention are 2,3-dichloro-1,4 benzoquinone and tetrachloro benzoquinone, which can readily be prepared by chlorination of 1,4-benzoquinone in a conventional manner as well known in the art. For example, the benzoquinone can be reacted with chlorine as well known in the art to form the desired chlorinated benzoquinone. Likewise, the preparation of cyano-substituted benzoquinones, as by the reaction of benzoquinone with KCN in acid solution, is well known in the art. Suitable cyano-substituted benzoquinones include 2,3-dicyano benzoquinone, tetracyano benzoquinone, and dichlorodicyano benzoquinone, which is formed by reacting dicyano benzoquinone with a mixture of hydrochloric and nitric acids.

A "pure" benzoquinone of the type indicated above refers to a benzoquinone in the form of an acicular, bright yellow crystalline material as opposed to the somewhat off-color, slightly greenish material often obtained in commercial supplies of benzoquinone. While not intending to be bound by any particular theory of operation, the purification techniques referred to above are believed to remove from the benzoquinone a by-product that may be formed upon standing for a period of time in an air atmosphere and/or by a photochemical reaction in the presence of light. By taking suitable precautions in the manufacture of the benzoquinone, it may be possible to produce the desired benzoquinone product of requisite purity for use in the present invention without the necessity of employing the purification techniques to produce a pure product as that term is employed herein. The retention of acicular, bright yellow crystalline benzoquinones in a pure state over an extended period of time may require precautionary measures such as storage in a nitrogen atmosphere and/or in the absence of light.

Various conventional techniques, such as sublimation and recrystallization, may be employed for the purification of an impure benzoquinone. Sublimation may be carried out in conventional sublimation apparatus at any suitable temperature, e.g., from about 65° to about 95°C, with from about 80° to about 85°C being generally preferred. Recrystallization can likewise be carried out in a conventional manner, as for example in the procedure outlined in Organic Synthesis, Vol. II, p. 553, John Wiley (New York).

It should be noted that, in those instances in which a substituted bnezoquinone is to be employed, the impure base material, e.g., 1,4-benzoquinone, may be purified as indicated above prior to the reaction to produce the substituted benzoquinone. Alternately, the substituted benzoquinone may be prepared from the impure base material and subsequently purified as by sublimation or recrystallization.

The amount of benzoquinone reduction promoter employed in the practice of the present invention is not critical and will vary somewhat depending upon the particular aromatic nitrogen compound undergoing reduction, the particular reducing agent and reduction promoter employed, the particular operating conditions employed, and the like. The benzoquinone reduction promoter will generally be employed, however, in an amount within the range of from about 0.5 to about 4.0 parts by weight of the pure benzoquinone per 100 parts of reducible aromatic nitrogen compound. Likewise, the amount of the conventional reducing agent employed is not a critical feature of the present invention. While the amount of reducing agent employed may vary as well known in the art, the reducing agent will ordinarily be employed in an amount within the range of from about 0.5 to 1.0 parts by weight per part of aromatic nitrogen compound undergoing reduction.

As previously indicated, the reduction of the aromatic nitrogen compounds to which this invention relates is ordinarily carried out in an alkaline reaction media. An alkali metal hydroxide, such as sodium hydroxide, is ordinarily preferred for this purpose. In the reduction of an aromatic nitrogen compound to the azoxy stage, the alkali metal hydroxide will typically be employed in an amount within the range of from about 0.25 to about 0.75 parts by weight per part of aromatic nitrogen compound being reduced. Water or any other suitable carrier may be employed in conventional amounts.

In the reduction of an aromatic nitrogen compound from the azoxy stage to the hydrazo stage, it is desirable to employ an alcohol, such as methanol, in the reaction mixture to provide a more suitable base reaction mixture. The alcohol can be employed in varying amounts but will generally be within the range of from about 3 to about 5 parts of said alcohol by weight per part of said aromatic nitrogen compound. When alcohol is thus employed, the amount of alkaline metal hydroxide included in the reaction mixture may be reduced. While the amount of such alkali metal hydroxide employed in this instance is not critical, generally from about 0.20 to about 0.33 parts of alkali metal hydroxide by weight per part of reducible aromatic nitrogen compound will be employed. A small amount of water, as for example about 10 percent to about 20 percent by weight of the alcohol present, may also be present in the reaction mixture during the preparation of hydrazo stage compounds in this manner.

In the reduction of aromatic nitrogen compounds from the azoxy to the hydrazo stage, it has been found particularly advantageous to employ a cyano-substituted pure benzoquinone reduction promoter. As indicated above, illustrative materials of this type include 2,3-dicyano-1,4-benzoquinone, dichlorodicyano benzoquinone, and tetracyano benzoquinone.

In another embodiment of this invention, it has been found particularly desirable to carry out the reduction of the aromatic nitrogen compound in a reaction mixture that contains a metallic cyanide compound, such as potassium cyanide or sodium cyanide. While the precise function of this cyanide compound is not fully understood, its presence has a catalytic effect enhancing the recovery of the desired reduction product. The metallic cyanide compound may be employed in varying amounts, the exact amount not being a critical feature of the invention. The cyanide compound will, however, ordinarily be employed in an amount within the range of from about 0.5 to about 4.0, preferably about 3.0, parts by weight per 100 parts of said aromatic nitrogen compound although larger amounts may also be employed. The presence of the metallic cyanide has been particularly advantageous in the reduction of a nitrogen compound from the azoxy to the hydrazo stage.

In one illustrative example of the process of the present invention, 157.5 parts of o-nitrochlorobenzene was emulsified in 250 parts of water along with 2.0 parts of freshly prepared, pure benzoquinone. Impure benzoquinone had been purified by sublimation at about 70°C to produce a pure acicular crystalline material of bright yellow color. To this mixture was added 90 parts of sodium hydroxide. 127 parts of a conventional reducing agent, i.e., 37 percent aqueous formaldehyde, was added over a 2 hour period and the reaction mixture was maintained at a temperature of about 55° to 65°C for an additional 2 hour period at atmospheric pressure. The reaction mixture was thereafter steam distilled to remove any excess o-nitrochlorobenzene, filtered, and washed with dilute acid to remove basic impurities. A similar run was made in which a reducing sugar, specifically 130 parts of "cerelose" was employed as the reducing agent in place of formaldehyde. Economical yields of the desired product, 2,2'-dichloroazoxybenzene, that is of over 80 percent of the theoretical yield, based on the o-nitrochlorobenzene charged, were obtained. In addition, unreacted o-nitrochlorobenzene was obtained and was available for reuse. It has been found that in similar runs employing certain commercially prepared benzoquinones, that were not "pure" in the sense that this term is used herein, the yield of the desired produced ranged from practically no yield at all to yields of less than 40 percent.

In a typical run for the reduction of the aromatic nitrogen compound from the azoxy stage to the hydrazo stage, 135 parts of 2,2'-dichloroazoxybenzene were added to a mixture of 55 parts of sodium hydroxide, 4 parts of potassium cyanide and 4 parts of pure dichlorodicyano-benzoquinone in 500 parts of methanol. To this mixture, 70 parts of "cerelose" reducing agent were added over a period of approximately 4 hours. A temperature of about 55°- 65°C was maintained in order to moderate the reduction process. After an additional period of about two hours, the reaction mixture was diluted with water, filtered, and washed with dilute acid to remove basic impurities. A substantial yield, e.g., over 70 percent of the theoretical yield based on the 2,2'-dichloroazoxybenzene charged, of the desired product, 2,2'-dichlorohydrazobenzene, was obtained. Similar runs with impure benzoquinone and substituted benzoquinones did not result in any appreciable yield of the desired product. The function of the postassium cyanide has been shown to be as an adjunct to the promoter effect of the benzoquinone and substituted benzoquinones of requisite purity for use in the practice of the present invention.

Benzoquinone has not heretofore been considered by the art as a satisfactory reduction promoter for the reduction or aromatic nitrogen compounds containing nitrogen in a reducible form as a nuclear substituent. The present invention is of particular significance in that benzoquinone and substituted benzoquinones are herein disclosed as being, contrary to general opinion, a satisfactory reduction promoter when employed in a form having requisite purity. Furthermore, a pure benzoquinone may readily and inexpensively be obtained from impure benzoquinone of the type heretofore found unsuitable for use as a reduction promoter.

While the invention has been described herein with reference to particular embodiments thereof, it will be appreciated that various changes and modifications can be made without departing from the scope of the invention as set forth in the appended claims.

Therefore, I claim:

1. In the process for the reduction to the azoxy stage of an aromatic nitrogen compound containing nitrogen in a reducible form as a nuclear substituent at a higher stage of oxidation than the azoxy stage by the action of a conventional reducing agent, the improvement consisting of carrying out the reduction in an alkaline reaction mixture in which a pure accicular, bright yellow crystalline benzoquinone has been incorporated, whereby the reduction of the aromatic nitrogen compound is promoted.

2. The process of claim 1 in which the pure benzoquinone is selected from the group consisting of 1,2-benzoquinone; 1,4-benzoquinone; substituted 1,2- and 1,4-benzoquinones; and mixtures thereof.

3. The process of claim 1 in which the reducing agent is selected from the group consisting of aldehydes, reducing sugars, and metal alcoholates.

4. The process of claim 1 in which the alkaline medium consists of an alkali metal hydroxide.

5. The process of claim 4 in which the amount of alkali metal hydroxide is from about 0.20 to about 0.40 part by weight per part of said aromatic nitrogen compound and including from about 3 to about 5 parts of alcohol per part of said aromatic nitrogen compound.

6. The process of claim 1 and including from about 0.5 to about 4.0 parts of metallic cyanide by weight per 100 parts of aromatic nitrogen compound in the reaction mixture.

7. The process of claim 3 in which the reducible aromatic nitrogen compound is o-nitrochlorobenzene and the resulting product is 2,2'-dichloroazoxybenzene.

8. The process of claim 3 in which the reducible aromatic nitrogen compound is nitrobenzene and the resulting product is azoxybenzene.

9. The process of claim 4 in which the aromatic nitrogen compound being reduced is nitrobenzene and the resulting product is azoxybenzene.

10. The process of claim 4 in which the aromatic nitrogen compound is o-nitrochlorobenzene and the resulting product is 2,2'-dichloroazoxybenzene.

* * * * *